(12) United States Patent
Schneider et al.

(10) Patent No.: US 12,330,511 B2
(45) Date of Patent: Jun. 17, 2025

(54) METHOD FOR OPERATING A FLYING OBJECT, AND FLYING OBJECT

(71) Applicant: Volkswagen Aktiengesellschaft, Wolfsburg (DE)

(72) Inventors: Dimitri Schneider, Hannover (DE); Hendrik Schröder, Sickte (DE); Christoph Käppner, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 220 days.

(21) Appl. No.: 17/920,369

(22) PCT Filed: Mar. 12, 2021

(86) PCT No.: PCT/EP2021/056325
§ 371 (c)(1),
(2) Date: Oct. 20, 2022

(87) PCT Pub. No.: WO2021/213733
PCT Pub. Date: Oct. 28, 2021

(65) Prior Publication Data
US 2023/0159191 A1    May 25, 2023

(30) Foreign Application Priority Data
Apr. 22, 2020   (DE) .......................... 102020205087.2

(51) Int. Cl.
*B60L 3/00* (2019.01)
*B64U 10/14* (2023.01)
*B64U 50/30* (2023.01)

(52) U.S. Cl.
CPC ............ *B60L 3/0046* (2013.01); *B64U 50/30* (2023.01); *B60L 2200/10* (2013.01);
(Continued)

(58) Field of Classification Search
CPC .............. B60L 3/0046; B60L 2200/10; B60L 2240/54; B60L 2240/547; B60L 2240/549;
(Continued)

(56) References Cited

U.S. PATENT DOCUMENTS

| 2005/0187677 A1 | 8/2005 | Walker |
| 2013/0221741 A1 | 8/2013 | Stanek et al. |

(Continued)

FOREIGN PATENT DOCUMENTS

| CN | 102577014 A | 7/2012 | |
| CN | 107074347 A * | 8/2017 | ............. B64C 19/00 |

(Continued)

OTHER PUBLICATIONS

PCT/EP2021/056325 International Search Report (Jun. 16, 2021).
(Continued)

*Primary Examiner* — Aniss Chad
*Assistant Examiner* — Christine Nguyen Huynh
(74) *Attorney, Agent, or Firm* — Peter Zura; LOZA & LOZA, LLP

(57) ABSTRACT

Technologies and techniques for operating a flying object, such as a battery-operated flying object that includes at least one battery system and at least one electric drive unit. During an emergency, a first power limit of the battery system can be increased to a second power limit of the battery system such that a safe emergency landing of the flying object is possible.

20 Claims, 3 Drawing Sheets

(52) U.S. Cl.
CPC ........... *B60L 2240/54* (2013.01); *B64U 10/14* (2023.01); *B64U 2201/20* (2023.01)

(58) Field of Classification Search
CPC ............. B60L 2250/10; B60L 2250/12; B60L 2260/162; B60L 58/10; B60L 58/13; B60L 3/0023; B64U 50/30; B64U 10/14; B64U 2201/20; B64U 50/11; B64U 50/12; B64D 2045/0085; Y02T 10/70
See application file for complete search history.

(56) References Cited

U.S. PATENT DOCUMENTS

| | | | |
|---|---|---|---|
| 2013/0257323 A1* | 10/2013 | Diamond | .................. B60L 3/12 320/118 |
| 2013/0320756 A1 | 12/2013 | Ritter | |
| 2014/0097290 A1 | 4/2014 | Leng | |
| 2017/0305548 A1 | 10/2017 | Ozaki | |
| 2018/0141676 A1* | 5/2018 | Suzuki | .................. B64U 10/16 |
| 2018/0170539 A1 | 6/2018 | Claridge et al. | |
| 2018/0244398 A1 | 8/2018 | Woodhouse et al. | |
| 2019/0326764 A1 | 10/2019 | Gu et al. | |
| 2019/0379219 A1 | 12/2019 | Snyder et al. | |
| 2020/0001735 A1* | 1/2020 | Cheng | .................. G08G 5/0091 |
| 2020/0338989 A1* | 10/2020 | Zhang | .................. H02J 7/0032 |

FOREIGN PATENT DOCUMENTS

| | | | |
|---|---|---|---|
| CN | 110844087 A | 2/2020 | |
| DE | 102011103572 A1 | 12/2011 | |
| DE | 102011010585 A1 | 8/2012 | |
| DE | 102011120439 A1 | 6/2013 | |
| DE | 102013225748 A1 * | 6/2015 | .............. B60L 58/13 |
| DE | 102014106538 A1 | 11/2015 | |
| DE | 102015215430 A1 | 2/2017 | |
| DE | 102016202195 A1 | 8/2017 | |
| DE | 102018102525 A1 | 8/2019 | |
| WO | 2016210432 A1 | 12/2016 | |
| WO | 2019082043 A2 | 5/2019 | |
| WO | 2019140617 A1 | 7/2019 | |

OTHER PUBLICATIONS

DE102020205087.2. Examination Report (Apr. 7, 2021).
Corresponding Chinese Application No. 202180030179.3. Office Action (Jun. 24, 2024).

* cited by examiner

METHOD FOR OPERATING A FLYING OBJECT, AND FLYING OBJECT

RELATED APPLICATIONS

The present application claims priority to International Patent App. No. PCT/EP2021/057635 to Schneider, et al., titled "Method For Operating A Flying Object, And Flying Object", filed Mar. 12, 2021, which claims priority to German Patent App. No. 10 2020 205 087.2, filed on Apr. 22, 2020, the contents of which is incorporated by reference in its entirety herein.

TECHNICAL FIELD

The present disclosure relates to a method for operating a flying object, such as a battery-operated flying object, comprising at least one battery system and at least one, at least partially electric drive unit, the battery system having a first power limit, and state data of the drive unit and/or of the flying object being recorded.

The present disclosure furthermore relates to a flying object, such as a battery-operated flying object, comprising at least one battery system, at least one, at least partially electric drive unit, and at least one control unit, the battery system having a first power limit, and state data of the drive unit and/or of the flying object being recorded by the control unit.

BACKGROUND

In contrast to vehicles, flying objects are subject to considerably higher requirements with regard to safe operation. The reason for this is the increased difficulty achieving a safe state in the event of a technical error of the flying object. In the case of a vehicle, the technical components can generally be shut off immediately in the event of a technical error, the vehicle can be stopped and thereby be transferred into a safe state. In contrast, a flying object, in particular one without traditional wings, such as a multi-copter, has to carry out a landing for this purpose that, depending on the trajectory of flight, is frequently associated with high demand for power.

After a technical error occurs, further propulsive power is required for a comparatively long duration until a safe state has been assumed, which is in the range of the maximum output of the drive during normal operation.

US 2005 0187677 A1, for example, shows a method for remotely controlling vehicles, and aircraft in particular. Separate electrical emergency storage batteries are provided, whereby redundant energy storage devices for the safe operation of the aircraft are available in the event of an emergency.

DE 10 2014 106 538 A1 discloses a method for operating an air transport vehicle, comprising a battery-powered drive and a battery for supplying the drive. In one embodiment, a minimum voltage is provided for the battery, the value of which is selected so that, below the minimum voltage, a deep discharge takes place. According to the method, no drop below the minimum voltage must occur since otherwise the battery may be damaged.

US 2013 0320756 A1 shows a method for monitoring electrical energy storage devices in an electrically operated vehicle. It is provided that a deep discharge of the electrical energy storage device is possible temporarily. The frequency of the deep discharge is recorded, and the option of the deep discharge is blocked, or a warning is output, when a certain number of deep discharges is exceeded.

DE 10 2011 120 439 A1 discloses a power supply device and a method for controlling the operation of a power supply device. It is possible in the case of the power supply device for a drop below a cut-off voltage to occur, whereby a deep discharge of an energy storage device of the power supply device is possible. So as not to damage the energy storage device, the output current of the power supply device is limited during the discharge.

SUMMARY

Aspects of the present disclosure are directed to a method for operating a flying object and a flying object, in which components of the drive train can be operated such that a safe operation is possible, while reducing the costs and/or the weight at the same time.

Some aspects are disclosed in the subject matter of the independent claims, wherein target state data are assigned to the state data, and that the first power limit can be increased to a second power limit when the target state data are fallen short of or exceeded. The trajectory of flight of the flying object can be arbitrarily configured. However, a trajectory of flight having low or no gliding capability is preferred.

In some examples, a battery system may be configured as a system made of interconnected battery cells, such as lithium-ion cells. The battery system may be configured with electrical current limits, which are defined such that potentially even more current could be drawn from the cell. However, this would result in more rapid damage in the cell. This, in turn, renders the cell unusable or reduces the service life or limits the function of cell otherwise.

In some examples, a drive unit can be configured to be purely battery electric, that is, can comprise an electric machine as the torque source. It is also conceivable to use a hybrid electric drive unit. This unit can comprise a battery and fuel cell system in connection with an electric machine, serving as the torque source. It is also conceivable that a gaseous-fuel or liquid-fuel-based drive unit is used in addition, for example a jet engine or a reciprocating engine.

In some examples, the number of drive trains within the drive unit can be one or more. The connection of the drive trains to the thrust-generating components, such as a propeller, can be arbitrarily configured. For example, one drive train would be conceivable for one propeller, or four separate drive trains for eight propellers, one drive train in each case being configured for two propellers.

The state data can include various data of the flying object. For example, propeller rotational speeds, temperatures both in the interior area and exterior area of the flying object, or the performance capability of the battery system are contemplated in the present disclosure. If, for example, the propeller rotational speed decreases, this is registered as a deviation from the target state. It is then possible that the second power limit is released to the battery system, at which, for example, a deep discharge of the battery system is possible.

Further aspects of the present disclosure will be apparent from the remaining features described in the dependent claims.

In some examples, a flying object, such as a battery-operated flying object, is disclosed, comprising at least one battery system, at least one at least partially electric drive unit and at least one control unit, the battery system having a first power limit, and state data of the drive unit and/or of the flying object being recorded by the control unit. The flying object is characterized in that the control unit assigns target state data to the state data, and that the first power limit can be increased to a second power limit when the target state data are fallen short of or exceeded. The control unit can cooperate with data interfaces of the flying object. The flying object can comprise a sensor system for this purpose, which can be addressed by the control unit.

The flying object can be operated by a pilot. However, it is also conceivable for the flying object to be remotely controlled. The flying object can also be controlled autonomously, for example by means of artificial intelligence.

In some examples, the battery system comprises a battery control unit, and the battery control unit ascertains and/or signals the state of the battery system following the increase of the first power limit to the second power limit. As a function of the determined state or the so-called "state of health" of the battery system, it can be signaled whether a battery replacement is necessary due to the use of the battery system, possibly beyond the first power limit.

The battery control unit can additionally determine whether a restart of the battery system is suppressed after the flying object has landed or whether, alternatively, a release of the battery system takes place, possibly with a reduced usable capacity.

In some examples, the battery control unit determines the state of the battery system as a function of the lowest occurring cell voltage of the battery system. Additionally, the integral of the cell voltage over time below the regular cut-off voltage, serving as the second power limit, can be used as an influencing variable.

In other examples, the flying object, aspects of flight may be carried out by the control unit.

The present disclosure relating to the method according to the present disclosure also apply, mutatis mutandis, to the flying object according to the present disclosure.

The various embodiments of the present disclosure described herein can advantageously be combined with one another, unless indicated otherwise in the specific instance.

BRIEF DESCRIPTION OF THE DRAWINGS

The present disclosure will be described hereafter in exemplary embodiments based on the associated drawings. In the drawings.

DETAILED DESCRIPTION

Figure 1:
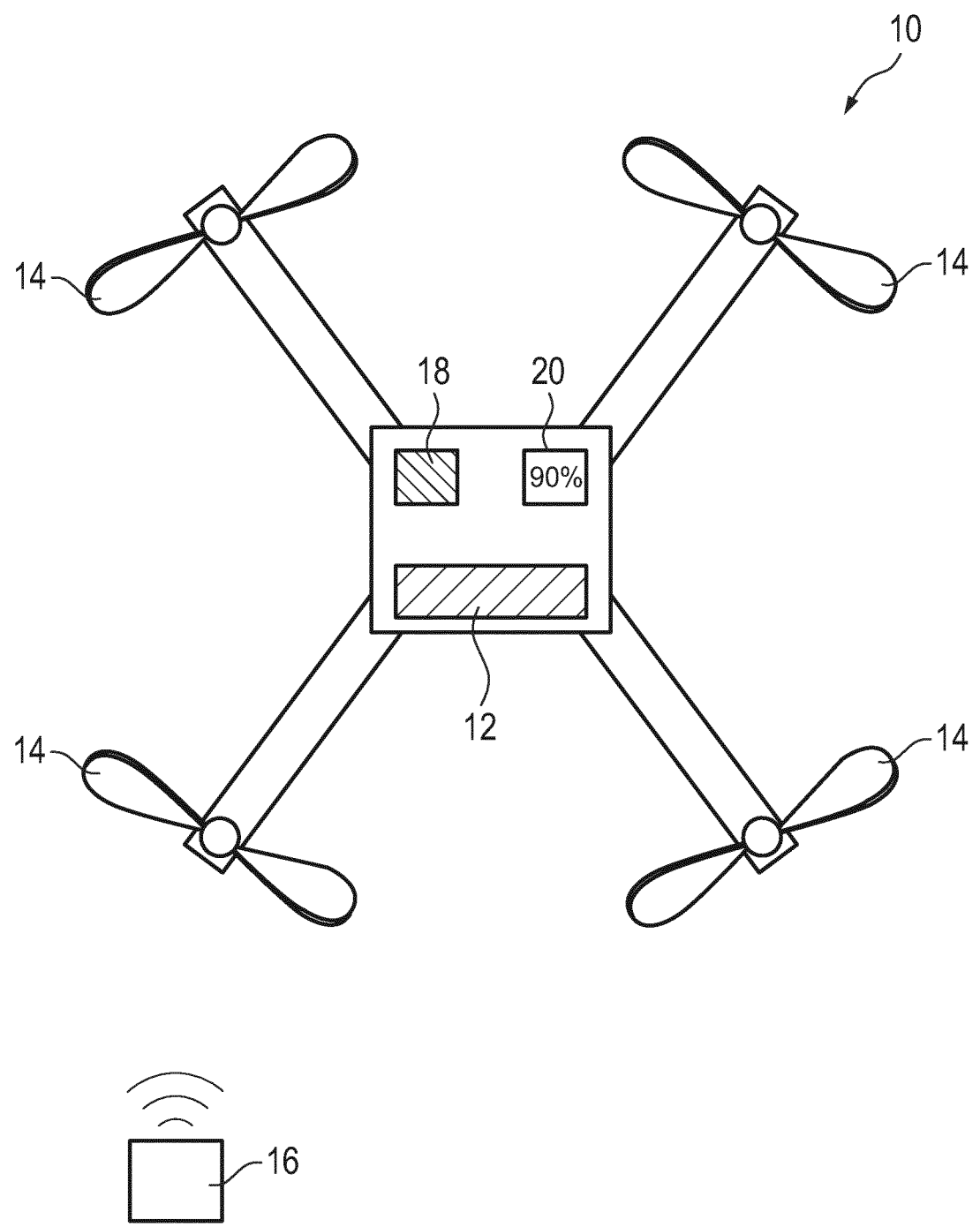
FIG. 1 shows a schematic representation of an exemplary embodiment of a flying object according to some aspects of the present disclosure.

Aspects of the present disclosure advantageously make it possible to operate components of the drive train such that these extend the power range and, accepting subsequent component damage and/or a decrease in the component service life into consideration, enable a safe landing of the flying object in the event of an emergency. Such an emergency scenario can in particular be handled by batteries of battery-operated flying objects.

The operational application of batteries in general represents a compromise between the released power or current limits and the decrease in service life associated with the operation. Higher power releases result in a shorter service life.

However, since these are possible in principle, a significant increase in power can be carried out for a short time. This results in wear on the battery, but safeguards the landing of the flying object if, for example, another battery system, which is required for normal operation, fails completely. Within the scope of the design of the drive train, requirements with regard to the redundancies of the employed technologies can be reduced with the aid of this measure, and the drive train can be configured to be less complex. As a result, the design is more cost-effective and has a lower mass, whereby the concept becomes more energy-efficient. For example, individual batteries do not have to be overdesigned, in terms of the power thereof, beyond the actual power requirement in the event of a failure of one of the systems.

The second power limit does not necessarily have to be statically defined. For example, the second power limit can be designed such that a deep discharge of the battery system is not yet or only partially possible.

In some examples, a recommendation may be provided to increase the first power limit to the second power limit when the target state data are fallen short of or exceeded by a first limit value. In this way, it is possible to convey to a pilot or, for example, a control unit that it may be advisable to increase the power limit of the battery system to the second power limit.

Alternately or in addition, the first power limit may be increased to the second power limit when the recommendation is confirmed by a pilot. The pilot consequently has a choice and can personally assess the situation. If, for example, sensors of the flying object should function in a faulty manner, the pilot himself or herself, however, is of the opinion that an increase of the first power limit to the second power limit is not necessary, the recommendation to increase the power does not need to be followed.

In some examples, the first power limit may be increased to the second power limit when the recommendation is confirmed by a control facility that is connected to the flying object. The control facility can, for example, be a ground control center, that is, an external control facility, which is wirelessly connected to the flying object. The link can be implemented by way of a communication interface, for example, via which all signal variables that arrive in the monitoring unit of the flying object are transmitted, preferably in a pooled manner, at regular intervals. The control facility can comprise a monitoring unit, which has a certain scope of functions for evaluating the state data.

Optionally, further staff can manage the control facility. The communication between the staff and the control facility is similar to that between a pilot and the monitoring of the state data in the flying object. In the event of an emergency scenario, the control facility can transmit a control recommendation to the flying object. This is incorporated into the functional block of the decision-making process in the flying object. Similar to the flying object, the control facility additionally transmits a situational assessment and recommendation for action to the pilot should the flying object require a pilot.

In some examples, the first power limit may be increased to the second power limit and carried out automatically when the target state data are fallen short of or exceeded by a second limit value during a detected emergency. As a result, it is automatically recognized that a power reserve is required since the power demand is considerably higher than expected, for example due to poor weather, or the power demand is considerably higher than expected due to the failure of a drive unit and the associated decreasing efficiency, or, for example, a second energy source in a hybrid drive has failed due to a fault. The second limit value indicates an emergency, while the first limit value draws attention to the fact that a malfunction may be present.

In some examples, a pilot may carry out the increase from the first power limit to the second power limit manually at any time.

Overall, it is provided that a prioritization of the different possible actions takes place. In this way, multiple, potentially conflicting instructions can be consolidated. For example, the pilot could release a recommendation for action and, at the same time, personally trigger an emergency program, or additionally an instruction of the control facility is present. Corresponding conflicts are resolved according to fixedly defined prioritization rules.

FIG. 1 shows a flying object 10 that includes a battery system 12 and an electric drive unit 14 in the form of four propellers. The flying object 10 is wirelessly connected to a control facility 16. Moreover, the flying object comprises a control unit 18 and a battery control unit 20. The battery system 12 has a first power limit and a second power limit. During normal operation, the battery system 12 and accordingly the flying object 10 are operated using the first power limit. During operation of the flying object 10, state data of the flying object 10, in particular of the drive unit 14, are recorded by the control unit 18. These state data are compared to target state data. When these state data deviate by a first limit value from the target state data, a recommendation to increase the first power limit to the second power limit is output by the control unit 18.

In this way, the complete discharge range until a cut-off voltage in the form of the second power limit is reached can be provided in its entirety as regularly usable energy source. The fact that the regular cut-off voltage, serving as the second power limit, has been reached is visualized to a pilot in the battery control unit 20 and/or the control facility 16 as 0% SOC, that is 0% state-of-charge. At the same time, a reserve, not to be used, of approximately 15%, for example, is additionally visualized by the battery control unit 20. This reserve may be activated in that, in the event of an exceptional or emergency situation, flying is possible beyond the 0% SOC level, for example, when a planned landing hub is occupied or blocked. One emergency situation that would also be conceivable is that the weather situation requires an unplanned deviation of the route or that the approach for a landing at the planned hub has to be repeated unexpectedly multiple times.

The battery control unit 20 recognizes that the cell voltage of the battery system falls short of a limit of 3 V, for example, and puts out a notice. However, no shut-off occurs, and no restriction of the power limits. The deep discharge by another 0.5 to 1 V provides an energy reserve of up to 20% of the overall energy content. After a successful emergency landing, the battery control unit 20 suppresses charging access or further discharging access to the battery system 12. Using a suitable location, for example a fault memory, the battery control unit stores the notice that a cell-damaging emergency deep discharge has occurred, and that a replacement of the battery system 12 is necessary. As an alternative, it is possible to reduce the state of health (SOH) using an aging model, and the battery system 12 can continue to be used if the remaining SOH is still sufficient.

Figure 2:
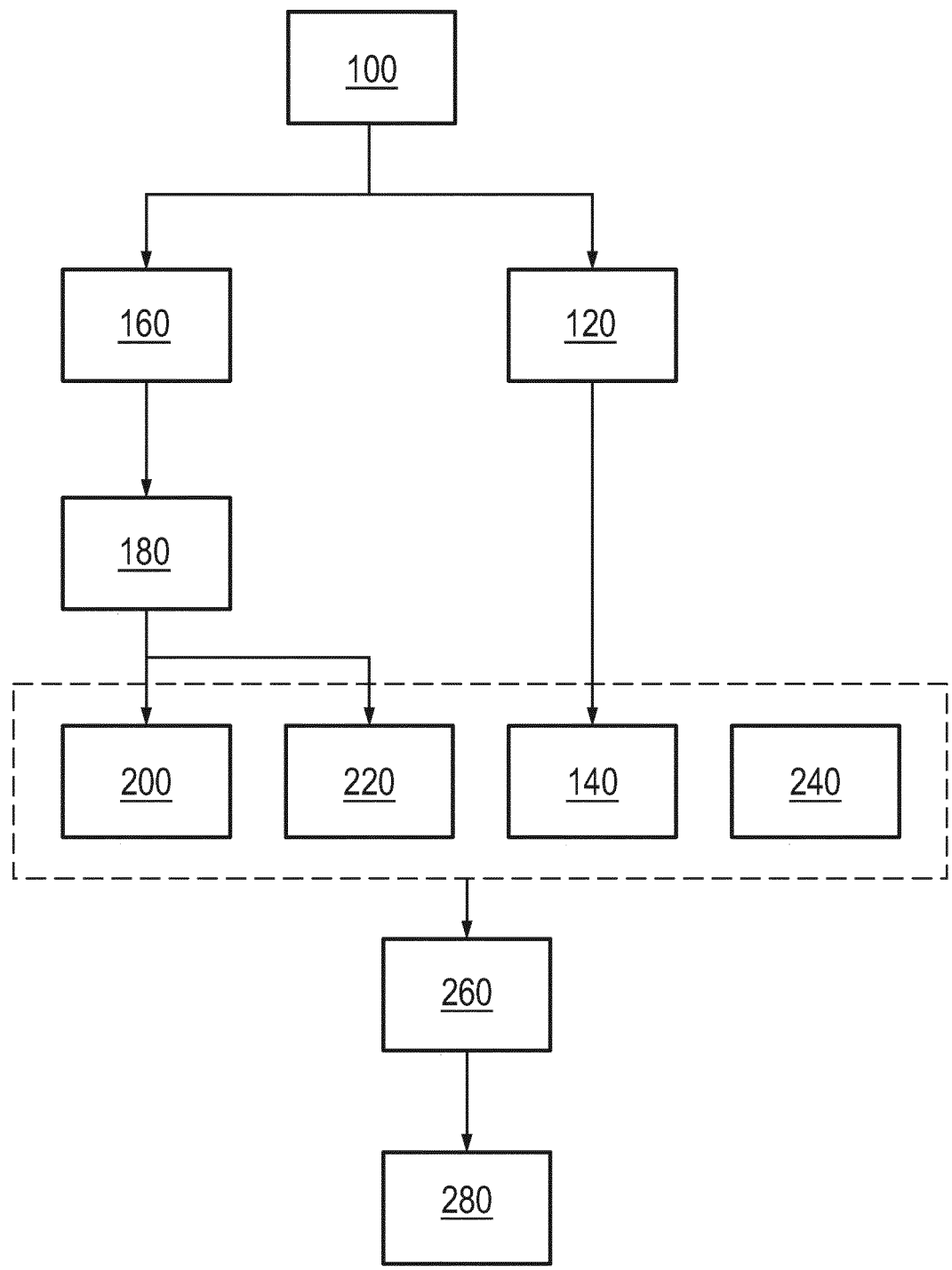
FIG. 2 shows a schematic representation of an exemplary embodiment of a method according to some aspects of the present disclosure.

FIG. 2 shows a schematic, step-by-step representation of an exemplary embodiment of a method according to the present disclosure for operating the flying object 10 according to FIG. 1. In step 100, it is recognized that state data of the flying object 10 or of the drive unit 14 do not correspond to the previously defined target state data. Step 120 shows the case when the state data deviate from the target state data by a higher, second limit value. In this case, an emergency is to be assumed. In step 120, the first power limit is therefore automatically increased to the second power limit so that the flying object 10 is able to carry out an emergency landing.

Step 160 shows the case when the state data deviate from the target state data by a first limit value. In this case, no emergency exists yet. The control unit 18 therefore, in step 180, only issues a recommendation that it may be advisable to increase the first power limit to the second power limit. This recommendation can be accepted or rejected by a pilot in step 200. It is also conceivable for the flying object 10 to be autonomously operated, without a pilot. As an alternative or in addition, this recommendation can be accepted or rejected by the control facility 16 or staff working in the control facility 16.

Step 240 illustrates that a pilot present in the flying object 10 at any time has the option of manually increasing the first power limit to the second power limit. Likewise, the staff in the control facility 16 can manually increase the first power limit to the second power limit. These options for action, which are summarized by the dotted line, can partially be carried out in parallel. For this purpose, a prioritization of the actions is provided for in step 260. In the event that, for example in step 200, the recommendation of the control unit 18 to increase the first power limit to the second power limit from step 180 was rejected, in the meantime, however, the situation has turned into an emergency, the automatic increase of the first power limit to the second power limit according to step 140 is nevertheless ultimately carried out in step 280. This decision is signaled to the pilot.

Figure 3:
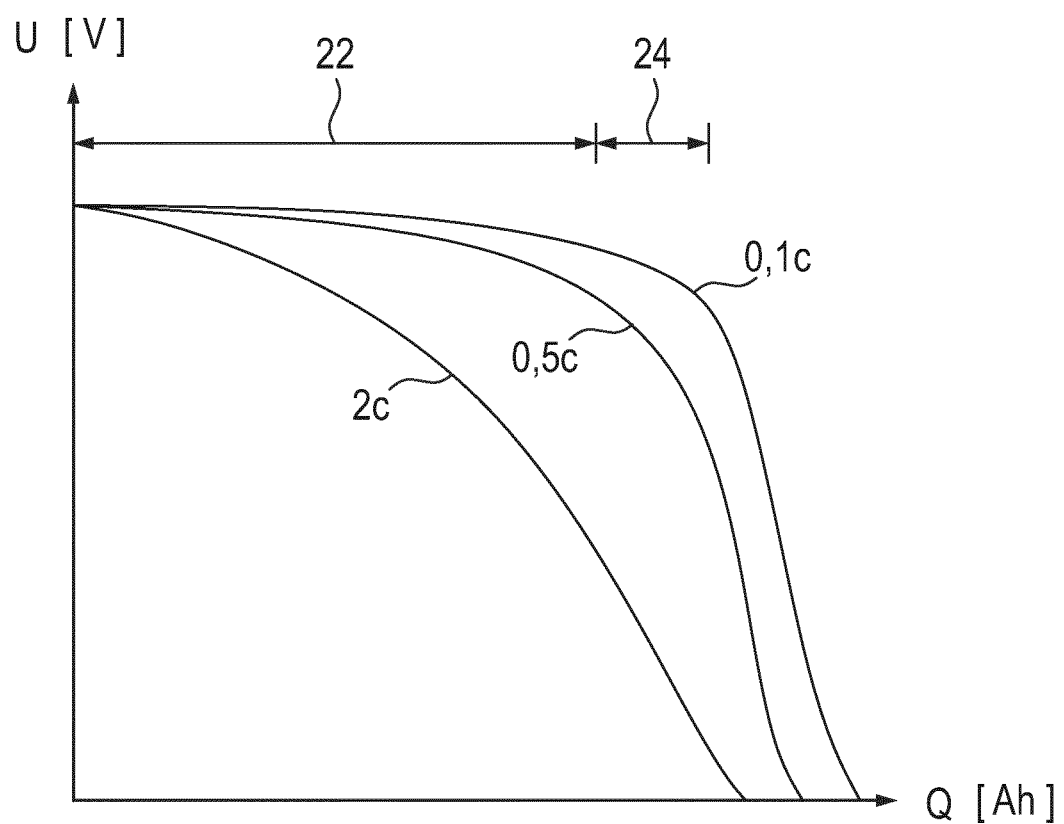
FIG. 3 shows a schematic representation of the usable cell capacity of a battery system according to an exemplary embodiment of the method according to some aspects of the present disclosure.

FIG. 3 shows the regularly usable cell capacity 22, which is, for example, an expected power load profile of 19 Ah. Furthermore, the additional cell capacity 24 is apparent. A release of the reduced cut-off voltage to the second power limit can be 6 Ah. In the case of a deep discharge of this scope, the cell must subsequently be replaced. The effects to be expected, which result from the deep discharge, can be a dissolution of copper out of the collector at the anode side, for example, and a copper dendrite formation on the carbon anode. The anode can become damaged by cracks. Cracks can also arise at the cathode side. Moreover, aluminum corrosion at the collector on the cathode side is to be expected, along with an associated loss of contact.

LIST OF REFERENCE SIGNS 10 flying object
12 battery system
14 drive unit
16 control facility
18 control unit
20 battery control unit
22 regularly usable cell capacity
24 additional cell capacity

The invention claimed is:
1. A method for operating a battery-operated flying object comprising at least one battery system and at least one electric drive unit, comprising:
determining a first power limit for the battery system;
recording current state data of the drive unit;

assigning configured target state data to the recorded current state data;

determining that the current state data does not meet the configured target data by one or more predetermined limit values; and automatically increasing the first power limit to a second power limit responsive to the determination that the current state data does not meet the configured target state data by the one or more predetermined limit values.

2. The method according to claim 1, further comprising generating a recommendation to increase the first power limit to the second power limit when the first limit value is not met.

3. The method according to claim 2, further comprising receiving a confirmation for the recommendation to increase the first power limit to the second power limit from a pilot of the battery-operated flying object.

4. The method according to claim 1, further comprising receiving a confirmation for the recommendation to increase the first power limit to the second power limit from a control facility associated with the battery-operated flying object.

5. The method according to claim 1, wherein increasing the first power limit to the second power limit comprises increasing the first power limit to the second power limit automatically when the second limit value is not met.

6. The method according to claim 1, wherein increasing the first power limit to the second power limit comprises increasing the first power limit to the second power limit manually when the second limit value is not met.

7. The method according to claim 1, wherein the one or more limit values comprises a first limit value and a second limit value, and wherein the first limit value indicates a potential malfunction, and the second limit value indicates as emergency malfunction.

8. A flying object, comprising
at least one battery system;
at least one drive unit; and
at least one control unit, wherein the control unit is configured to
determine a first power limit for the at least one battery system;
record current state data of the at least one drive unit;
assign configured target state data to the recorded current state data; and
determine that the current state data does not meet the configured target data by one or more limit values; and
automatically increase the first power limit to a second power limit responsive to the determination that the current state data does not meet the configured target state data by the one or more configured limit values.

9. The flying object according to claim 8, wherein the control unit is configured to generate a recommendation to increase the first power limit to the second power limit when the first limit value is not met.

10. The flying object according to claim 9, wherein the control unit is configured to receive a confirmation for the recommendation to increase the first power limit to the second power limit from a pilot of the battery-operated flying object.

11. The flying object according to claim 8, wherein the control unit is configured to receive a confirmation for the recommendation to increase the first power limit to the second power limit from a control facility associated with the battery-operated flying object.

12. The flying object according to claim 8, wherein the control unit is configured to increase the first power limit to the second power limit automatically when the second limit value is not met.

13. The flying object according to claim 8, wherein the control unit is configured to increase the first power limit to the second power limit manually when the second limit value is not met.

14. The flying object according to claim 8, wherein the one or more limit values comprises a first limit value and a second limit value, and wherein the first limit value indicates a potential malfunction, and the second limit value indicates as emergency malfunction.

15. A flying object, comprising
at least one battery system;
at least one drive unit; and
at least one control unit, wherein the control unit is configured to
determine a first power limit for the at least one battery system;
record current state data of the at least one drive unit;
assign configured target state data to the recorded current state data; and
determine that the current state data does not meet the target data by one or more configured limit values, wherein the one or more limit values comprises a first limit value and a second limit value, and wherein the first limit value indicates a potential malfunction, and the second limit value indicates as emergency malfunction; and
automatically increase the first power limit to a second power limit responsive to the determination that the current state data does not meet the configured target state data by the one or more predetermined limit values.

16. The flying object according to claim 15, wherein the control unit is configured to generate a recommendation to increase the first power limit to the second power limit when the first limit value is not met.

17. The flying object according to claim 16, wherein the control unit is configured to receive a confirmation for the recommendation to increase the first power limit to the second power limit from a pilot of the battery-operated flying object.

18. The flying object according to claim 15, wherein the control unit is configured to receive a confirmation for the recommendation to increase the first power limit to the second power limit from a control facility associated with the battery-operated flying object.

19. The flying object according to claim 15, wherein the control unit is configured to increase the first power limit to the second power limit automatically when the second limit value is not met.

20. The flying object according to claim 15, wherein the control unit is configured to increase the first power limit to the second power limit manually when the second limit value is not met.

* * * * *